United States Patent
Park et al.

(10) Patent No.: US 9,864,504 B2
(45) Date of Patent: Jan. 9, 2018

(54) USER INTERFACE (UI) DISPLAY METHOD AND APPARATUS OF TOUCH-ENABLED DEVICE

(71) Applicant: Samsung Electronics Co., Ltd., Gyeonggi-do (KR)

(72) Inventors: Chanho Park, Yongin-si (KR); Kyungmin Park, Seoul (KR); Myungjoo Ham, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/060,153

(22) Filed: Oct. 22, 2013

(65) Prior Publication Data

US 2014/0111451 A1  Apr. 24, 2014

(30) Foreign Application Priority Data

Oct. 23, 2012  (KR) .................. 10-2012-0117802

(51) Int. Cl.
*G09G 1/00*   (2006.01)
*G06F 3/0488*   (2013.01)

(52) U.S. Cl.
CPC ........ *G06F 3/0488* (2013.01); *G06F 3/04883* (2013.01)

(58) Field of Classification Search
CPC ........ G06F 3/0346; G06F 3/038; G06F 3/041; G06F 1/00; G06F 3/017; G06F 3/044; G09G 5/00

See application file for complete search history.

(56) References Cited

U.S. PATENT DOCUMENTS

| | | | |
|---|---|---|---|
| 2009/0109187 A1* | 4/2009 | Noma | G06F 3/04883 345/173 |
| 2010/0097331 A1* | 4/2010 | Wu | 345/173 |
| 2011/0148915 A1* | 6/2011 | Kim | 345/619 |
| 2014/0035883 A1* | 2/2014 | Mercea | G06F 3/042 345/179 |

FOREIGN PATENT DOCUMENTS

JP   2009110286   5/2009

* cited by examiner

*Primary Examiner* — Michael Faragalla
(74) *Attorney, Agent, or Firm* — The Farrell Law Firm, P.C.

(57) ABSTRACT

A user interface display method and apparatus of a touch-enabled device is provided. The user interface display method includes detecting a touch gesture; analyzing at least one of a contact position, a movement direction, a contact area size, a contact area shape, and an occurrence frequency of the touch gesture; determining one of a left hand grip state and a right hand grip state of the device based on a result of the analysis; and displaying a user interface corresponding to the determined one of the left hand grip state and the right hand grip state.

17 Claims, 8 Drawing Sheets

USER INTERFACE (UI) DISPLAY METHOD AND APPARATUS OF TOUCH-ENABLED DEVICE

PRIORITY

This application claims priority under 35 U.S.C. §119(a) to a Korean Patent Application filed on Oct. 23, 2012 in the Korean Intellectual Property Office and assigned Serial No. 10-2012-0117802, the entire disclosure of which is incorporated herein by reference.

BACKGROUND OF THE INVENTION

1. Field of the Invention

The present invention generally relates to a User Interface (UI) display method and apparatus for supporting touch-based input and, more particularly, to a UI display method and apparatus of a touch-enabled device for detecting a user's single hand grip state and displaying the UI configured in adaptation to the signal hand grip state to improve user convenience.

2. Description of the Related Art

Typically, conventional portable terminals are equipped with a touch panel and a camera so as to process and store an image taken by the camera and receive a user input for controlling the operation of the terminal and entering data by means of the touch panel. More recently, conventional portable terminals usually include text and speech recognition functions.

With the development of digital technologies, various user devices supporting communication and information processes on the move are commercialized in the form of mobile communication terminals, Personal Digital Assistants (PDA), electronic organizers, smartphones, tablet Personal Computers (PC), and the like. Such user devices have features such as, for example, video call, electronic organizer, video capture, email, broadcast playback, Internet access, music file playback, schedule manager, Social Network Service (SNS), messenger, dictionary, and games.

With the developments in touchscreen technology, touch-enabled user devices are becoming increasingly popular. The touchscreen serves as an input device as well a display device, making it possible for the user to make a touch gesture with a displayed object (e.g., finger, pointer, and pen) to generate an input signal for manipulating the touch-enabled device. The mobile device, equipped with the touchscreen, enables the user to intuitively make an input while viewing the screen such that even the user unfamiliar with the mobile device can use various functions of the device.

Meanwhile, the screen size of mobile devices such as smartphones is increasingly becoming larger. Certain mobile devices have screens that are larger than 5 inches, which makes it difficult for the user to manipulate the mobile device with one hand. Particularly for children or people having small hands, the single hand manipulation of the enlarged screen of the mobile device is almost impossible.

In order to overcome this problem, it can be considered to change the layout of the UI according to the hand gripping the mobile device, i.e. switching between a right hand-oriented UI for a right hand grip and a left hand-oriented UI for a left hand grip.

Conventional methods have proposed equipping the device with special means, such as sensors, for detecting the hand that grips the device and changing the UI according to the detected result. For example, U.S. Patent Publication No. US20100097331A1 proposes mounting sensors at the bottom left and right corners of the device to distinguish between left and right hand grips. Although this method can distinguish between left and right hand grips accurately, it has drawbacks such as increasing a manufacturing cost of the device, requiring extra device mounting space, and overhead for processing the sensors.

In another example, U.S. Patent Publication No. US20100085317A1 proposes mounting a tactile sensor at a side of the device to control the UI. However, this method also suffers from the same drawbacks mentioned above.

SUMMARY OF THE INVENTION

The present invention has been made to address at least the above problems and disadvantages and to provide at least the advantages discussed below. Accordingly, an aspect of the present invention provides a User Interface (UI) display method and apparatus of a touch-enabled device that is capable of improving user convenience by optimizing the UI layout in adaptation to a grip.

It is another aspect of the present invention to provide a UI display method and apparatus of a touch-enabled device that is capable of detecting a user's single hand grip, when a touch input is made on the touchscreen, and displaying a UI layout optimized according to UI arrangement coordinates and an order matching the detected left/right grip.

It is another aspect of the present invention to provide a UI display method and apparatus of a touch-enabled device that is capable of detecting left/right hand grip in real time to change the UI layout dynamically in adaptation to the detected grip.

It is still another aspect of the present invention to provide a UI display method and apparatus of a touch-enabled device that is capable of determining the single-handed grip of the user by analyzing at least one of a touch area size, touch position(s), a touched area shape, a movement direction, and an occurrence frequency, without mounting any extra sensors onto the apparatus.

In accordance with an aspect of the present invention, a user interface display method of a touch-enabled device is provided. The method includes detecting a touch gesture; analyzing at least one of a contact position, a movement direction, a contact area size, a contact area shape, and an occurrence frequency of the touch gesture; determining a left/right hand grip state of the device as a result of the analysis; and displaying a user interface corresponding to the determined left/right hand grip state.

In accordance with another aspect of the present invention, a user interface display apparatus of a touch-enabled device is provided. The user interface display apparatus includes a display panel configured to display a user interface; a touch panel configured to detect a touch gesture made on the display panel; and a control unit configured to analyze at least one of a contact position, a movement direction, a contact area size, a contact area shape, and an occurrence frequency of the touch gesture, determine a left/right hand grip state of the device as a result of the analysis, and display a user interface corresponding to the determined left/right hand grip state.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described with reference to the accompanying drawings. The same reference numbers are used throughout the drawings to refer to the same or similar parts. Detailed descriptions of well-known functions and structures incorporated herein may be omitted to avoid obscuring the subject matter of the present invention.

A description is made of the configuration and operation control method of the touch-enabled device according to an embodiment of the present invention with reference to the accompanying drawings. However, the present invention is not limited to the following description but can be implemented with various modifications.

Figure 1:
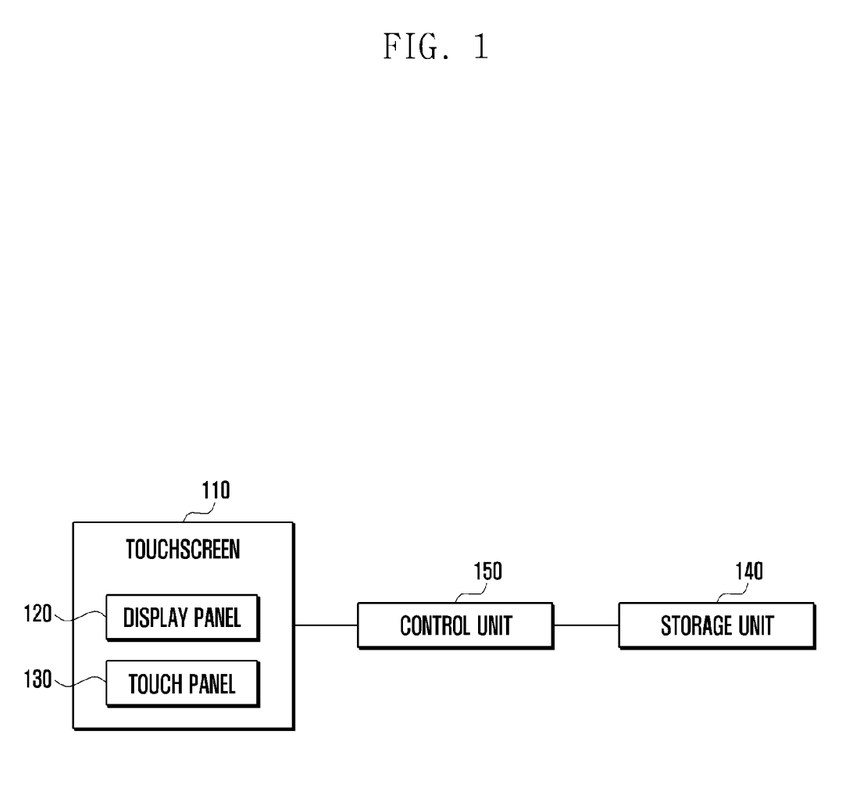
FIG. 1 is a block diagram illustrating a configuration of a touch-enabled device according to an embodiment of the present invention.

FIG. 1 is a block diagram illustrating the configuration of the touch-enabled device according to an embodiment of the present invention.

As shown in FIG. 1, the touch-enabled device includes a touchscreen 110, a storage unit 140, and a control unit 150. The touch-enabled device may also include, for example, an audio processing unit (not shown) having a microphone and a speaker, a digital broadcast module (not shown) for receiving digital broadcast signal such as Digital Multimedia Broadcasting (DMB) and Digital Video Broadcasting (DVB) signals, a camera module (not shown) for taking still and motion pictures of a scene, a short range communication module (not shown) (e.g. Bluetooth module, Infrared Data Association (IrDA) module, Radio Frequency Identification (RFID) module, and Near Field Communication (NFC) module)), an input unit (not shown) supporting hard key-based inputs, a Radio Frequency (RF) module (not shown) for supporting mobile voice telephony, video conference, and data communication functions, an Internet Protocol (IP) based Internet access service module (not shown), and a battery (not shown) for supplying power to the aforementioned components, although not described thereon.

The touchscreen 110 serves as input and output means for receiving user input and displaying information simultaneously via a display panel 120 and a touch panel 130. Particularly, in an embodiment of the present invention, the touchscreen 110 detects a user's touch gesture on the touch panel 130 in a state in which a User Interface (UI) including icons is displayed on the display panel 120 and generates a corresponding input signal to the control unit 150. Then the control unit 150 rearranges the UI including the icons and displays the rearranged UI on the display panel 120.

The display panel 120 is configured to display a screen related to the operation state of the touch-enabled device. For example, the display pane 120 is configured to display a lock screen, a sleep mode screen, a home screen, a menu screen, various icons, and an execution screen of one of applications mapped to the icons.

The display panel 120 is configured to display a pattern-unlock means or a sliding unlock means.

The touch gesture, which is made on the touchscreen 110 to unlock the lock screen and/or sleep mode screen, is analyzed by the control unit 150 and used as a factor for determining the grip mode (i.e., left hand grip mode or right hand grip mode).

That is, the control unit 150 is configured to determine whether the current grip mode is the left hand grip mode or the right hand grip mode by analyzing at least one of a touched area size, a touch position, a movement direction, and an occurrence frequency. The touch input, screen configuration, and exemplary screens on the display panel 120 will be described later.

According to an embodiment of the present invention, the display panel 120 is implemented as a Liquid Crystal Display (LCD). However, the present invention is not limited thereto and the display panel 120 may instead be implemented as, for example, one of a Light Emitting Diode (LED) display, an Organic LED (OLED) display, and an Active Matrix OLED (AMOLED) display. The display panel 120 can be configured so as to display the execution screen in a landscape mode or a portrait mode and switch between the landscape mode and the portrait mode in adaptation to the rotation (or orientation) of the touch-enabled device.

The touch panel 130 may be situated to cover the surface of the display panel 120 so as to detect the touch gesture made by the user on the surface of the touchscreen 110.

If a touch gesture is detected on the surface of the touchscreen 110, the touch panel 130 extracts the coordinates of touch position and sends the extracted coordinates to the control unit 150.

That is, the touch panel 130 detects the touch gesture made by the user and transmits an input signal corresponding to the touch gesture to the control unit 150. The control unit 150 analyzes at least one of the touched area size, the touch position, the movement direction, and the occurrence frequency to determine whether the current grip mode is the left hand grip mode or the right hand grip mode.

The touch panel 130 is configured to detect the touch gesture in one of the lock mode, idle mode, and execution mode; and to measure the touch duration and touch occurrence periodicity.

The storage unit 40 stores various applications, which are executed and processed in the touch-enabled device, and application data and may be implemented as at least one of non-volatile and flash memories. In an embodiment of the present invention, the storage unit 140 can be implemented as, for example, at least one of Read Only Memory (ROM), flash memory, Random Access Memory (RAM), internal hard disk drive (HDD), external HDD, and other types of external storage media.

The storage unit 140 is configured to store an Operating System (OS) of the touch-enabled device, application programs and data related to the touchscreen-based input and display operations, and application programs and data related to the lock mode release function.

Specifically, the storage unit is capable of storing the information related to the touch gestures, which are detectable in one of the lock mode, idle mode, and execution mode of the touch-enabled device, and the information related to the touch duration and touch occurrence periodicity.

The storage unit 140 is also configured to store the information on at least one of the touched area size, the touch position, and the movement direction that is analyzed by the control unit 150 and the information on the left hand grip mode and the right hand grip mode determined by the control unit 150.

The control unit 150 controls overall operations of the touch-enabled device. According to an embodiment of the present invention, the control unit 150 is configured to receive the input signal generated by the touch screen 110 in correspondence with the touch gesture detected in one of the lock mode, idle mode, and execution mode; analyze the input signal to acquire at least one of the touched area size, the touch position, a touched area shape, the movement direction, and the occurrence frequency; rearrange the UI, including the icons, depending on whether the current grip mode is the left hand grip mode or the right hand grip mode; and control the display panel 120 to display the rearranged UI.

In this way, the control unit 150 is configured to control the operations associated with the UI display method according to an embodiment of the present invention. The detailed control operations of the control unit 150 will be explained in further detail below.

The control unit 150 is configured to control the operations related normal functions of the touch-enabled device as well as the functions of the present invention. For example, the control unit 150 is configured to control execution of a certain application and display of the executed application. The control unit 150 is also configured to control the input signals generated in correspondence to various touch gestures detected through the touch input interface and the corresponding functions based on the input signal. The control unit 150 is also capable of controlling data communicated through a wired and/or wireless communication channel.

The touch-enabled device depicted in FIG. 1 may include any type of information communication devices, multimedia devices and their equivalents supporting the functions of the present invention. For example, the touch-enabled device may include any of various communication protocol-enabled mobile communication terminals, tablet Personal Computers (PC), smartphones, digital cameras, Portable Multimedia Players (PMP), media players, portable game consoles, laptop computers, and Personal Digital Assistants (PDA). Also, the UI display method of the present invention is applicable to various touch-enabled display devices including, for example, Digital Televisions (TV), Digital Signage (DS), Large Format Displays (LFD), laptop computers, etc.

FIGS. 2 to 7 are diagrams illustrating examples of triggering a single hand grip mode of a touch-enabled device according to an embodiment of the present invention.

Figure 2:
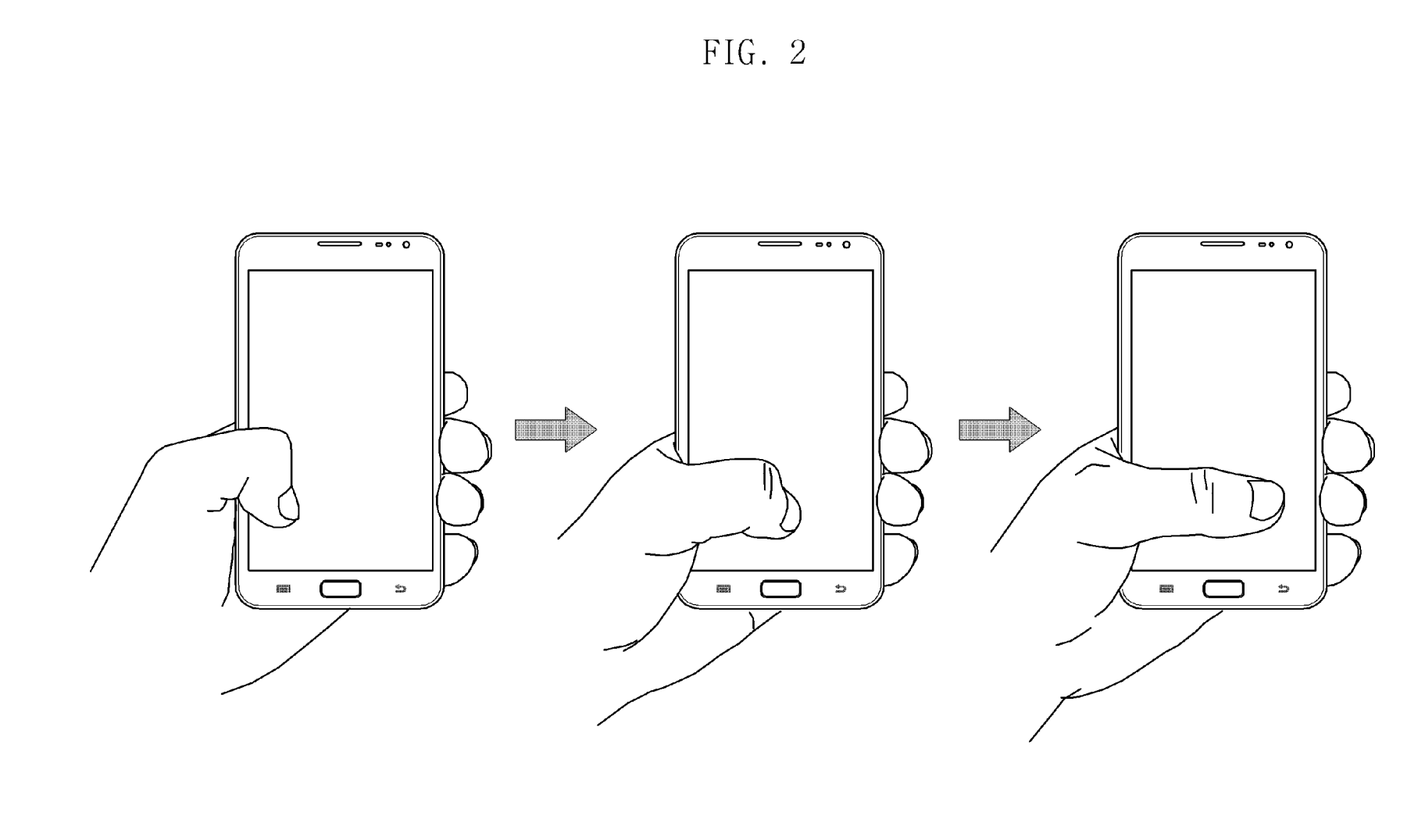
FIG. 2 is a diagram illustrating an example of making a touch input in a single-handed grip state in the user interface display method according to an embodiment of the present invention.
Figure 3:
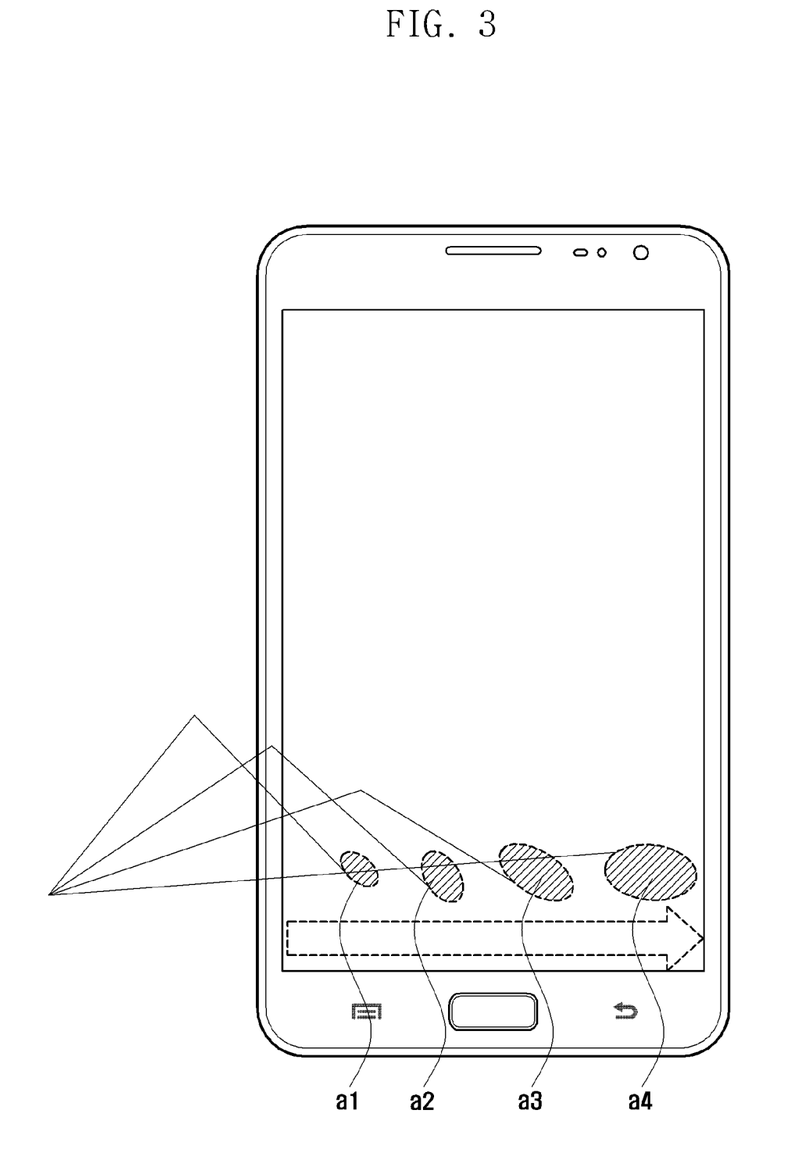
FIG. 3 is a diagram illustrating an example of detecting a left hand grip state in the user interface display method according to an embodiment of the present invention.
Figure 4:
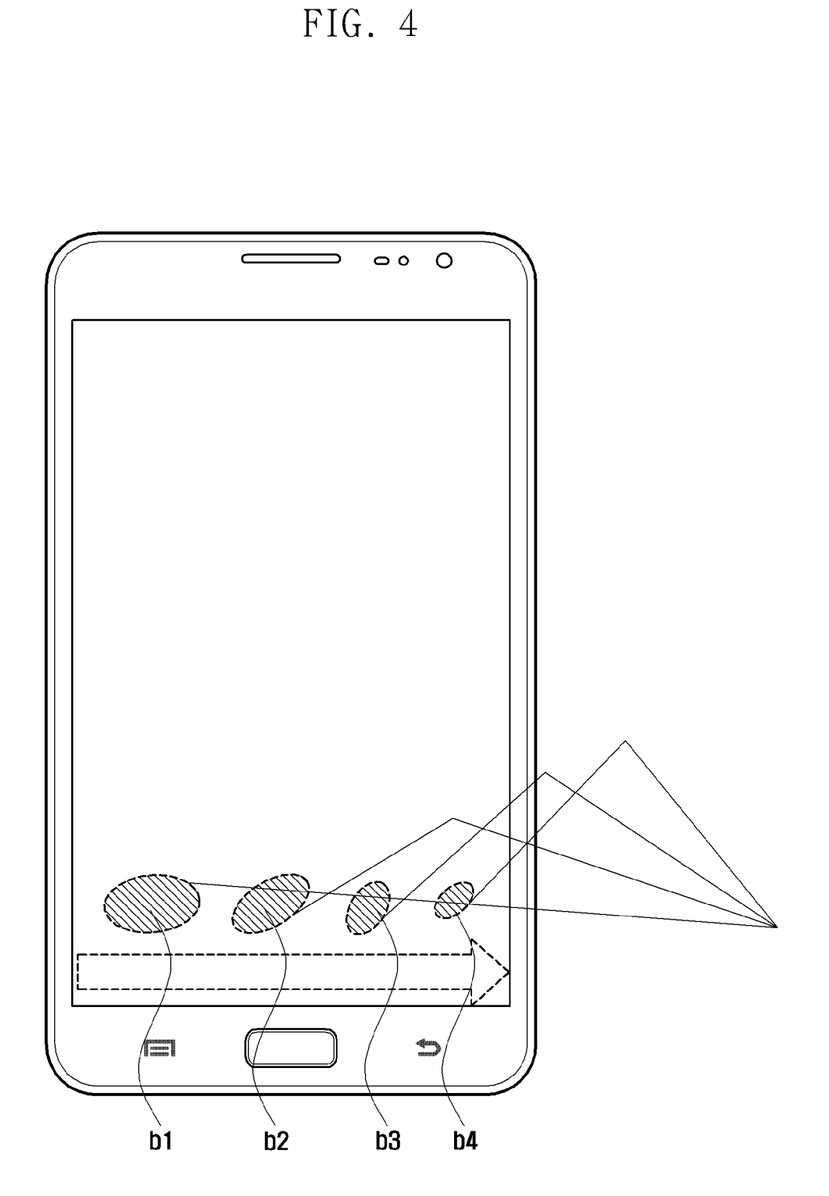
FIG. 4 is a diagram illustrating an example of detecting a right hand grip state in the user interface display method according to an embodiment of the present invention.
Figure 5:
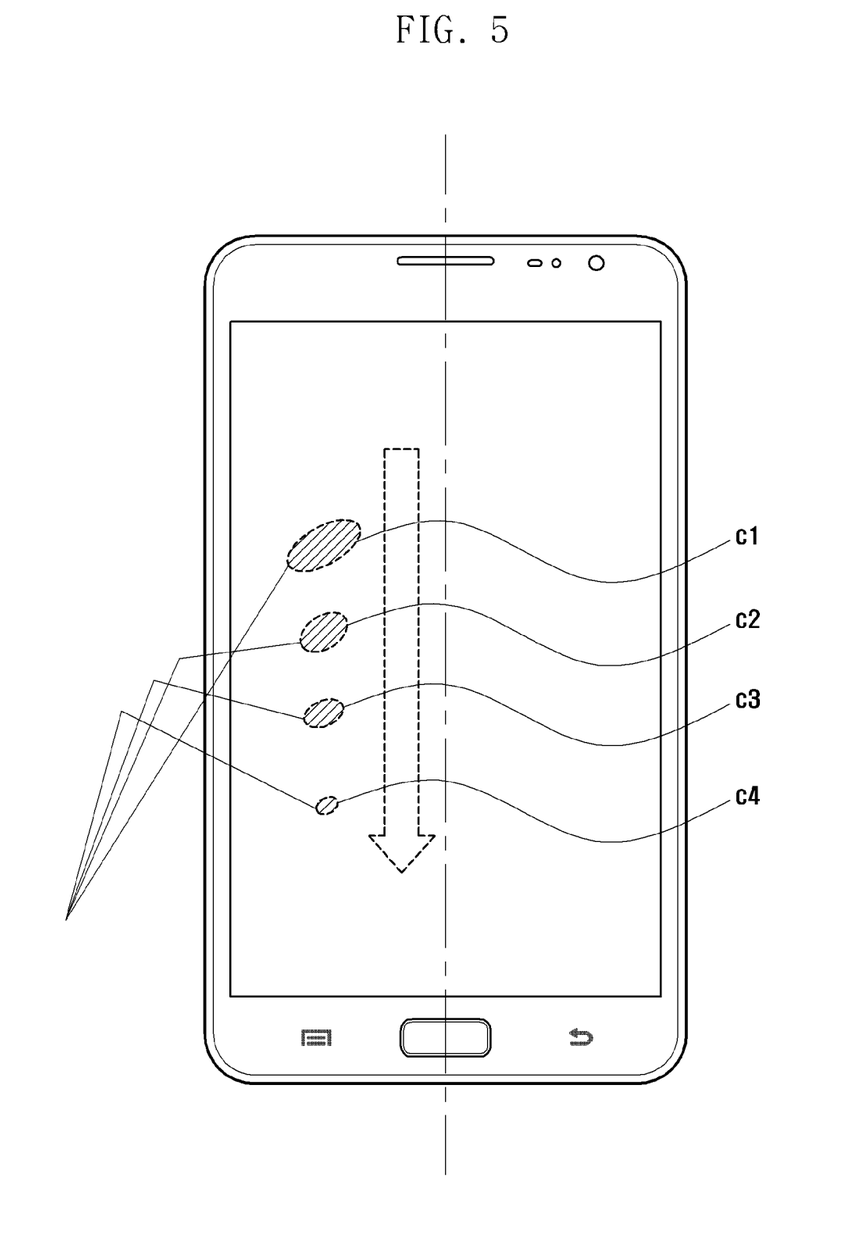
FIG. 5 is a diagram illustrating another example of detecting a left hand grip state in the user interface display method according to an embodiment of the present invention.
Figure 6:
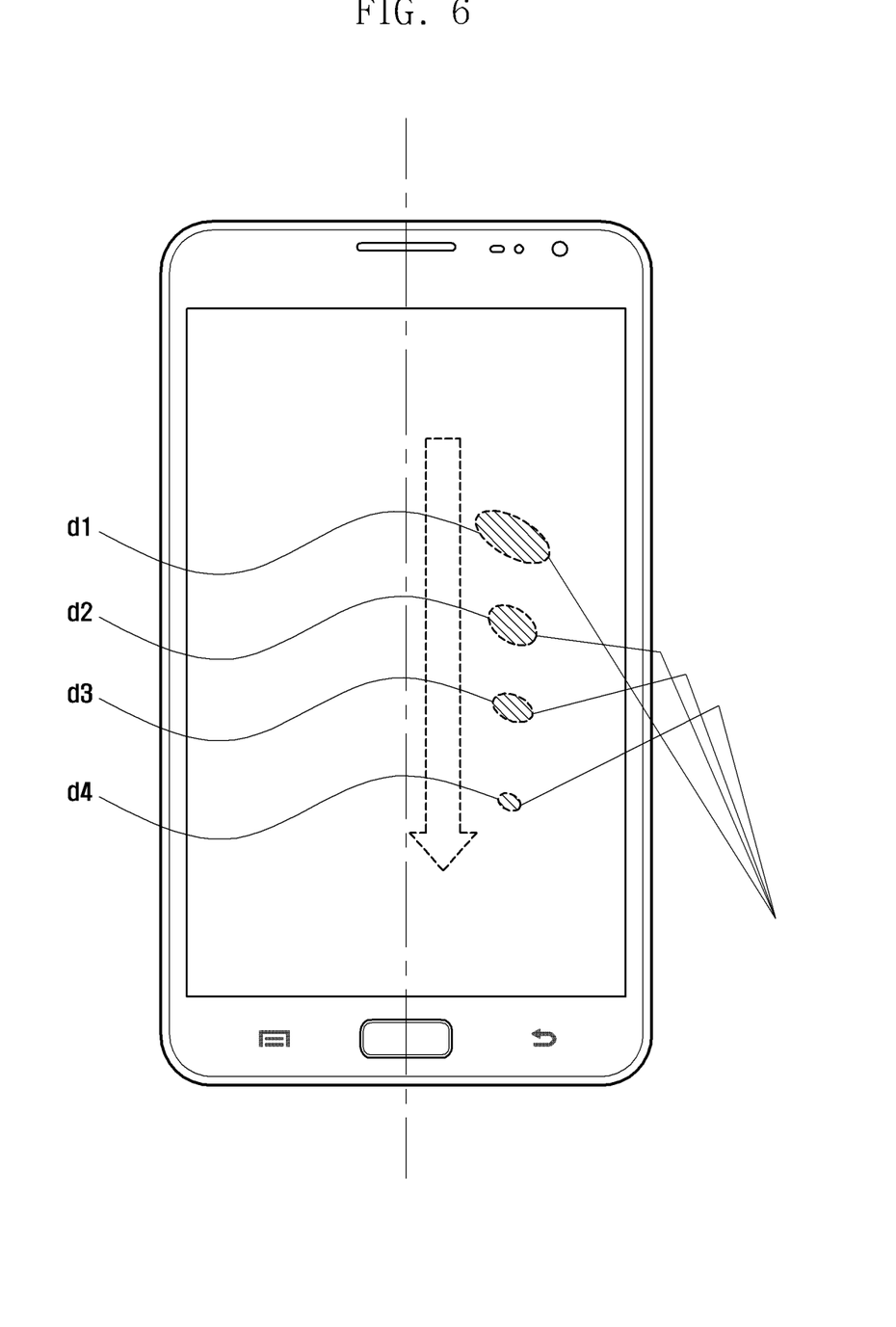
FIG. 6 is a diagram illustrating another example of detecting a right hand grip state in the user interface display method according to an embodiment of the present invention.

FIG. 2 shows a situation in which the user makes a touch gesture on the screen of the touch-enabled device while holding the touch-enabled device with one hand. FIGS. 3 and 5 show touched area size change patterns of sliding touches detectable in the left hand grip state. FIGS. 4 and 6 show the touched area size change patterns of sliding touches detectable in the right hand grip state.

Referring to FIG. 2, if the user slides a finger on the touchscreen 110, the sliding trace of the finger may be displayed on the screen visually.

For example, many touch-enabled devices adopt a slide-to-unlock mechanism to wake up the device from the sleep mode or unlock the locked state of the device.

In an embodiment of the present invention, the device is c configured to determine the single hand grip mode entry based on the slide-to-unlock mechanism for waking up the device or unlocking the locked state of the device. That is, the device analyzes the slide-to-unlock touch and determines the single hand grip mode to be applied based on a result of the analysis.

FIG. 2 shows an exemplary situation in which the user holds the device with the left hand and slides the thumb on the screen from left to right to perform the slide-to-unlock touch.

Such a sliding touch gesture is characterized in that the touched position and touched area size change as the finger is sliding.

When the user slides the left thumb from left to right on the touchscreen 110 in the left hand grip state, as shown in FIG. 2, the touched area size increases in increments as denoted by reference characters a1, a2, a3, and a4 shown in FIG. 3.

This is because, in the left hand grip state, the contact area on the screen surface increases as the folded left thumb joints are stretched to make the left-to-right sliding gesture and shrinks as the stretched left thumb joints are folded to make a right-to-left sliding gesture.

In this respect, the touch panel 130 is configured to detect the slide touch gesture made on the touchscreen 110 and transmit the corresponding slide touch information to the control unit 150.

The control unit 150 is configured to analyze the slide touch information to acquire at least one of the touch position, the sliding direction, and the change in size of the touched area.

In the case shown in FIG. 3, the control unit 150 analyzes the slide touch signal from the touch panel 130 to check the left-to-right slide direction and the touch area size increment, and determines the left hand grip state based on the result of the analysis.

The touch gesture analysis and the left hand grip state determination can be performed by the control unit 150, based on the preconfigured mapping information between the left hand grip mode and at least one of the touched position, the movement direction of the touch, and the change in the size of the touched area.

Referring to FIG. 4, when the user slides the right thumb from left to right on the touchscreen 110 in the right hand grip state, unlike the situation of FIG. 2, the touched area size decreases as denoted by reference characters b1, b2, b3, and b4.

This is because, in the right hand grip state, the contract area on the screen surface shrinks as the stretched right thumb joints are folded to make the left-to-right sliding gesture and enlarges as the folded right thumb joints are stretched to make the right-to-left sliding gesture.

The touch panel 130 detects the slide touch gesture made on the touchscreen 110 and transmits the corresponding slide touch information to the control unit 150.

The control unit 150 is configured to analyze the slide touch information to acquire at least one of the touch position, the sliding direction, and the change in size of the touched area.

In the case shown in FIG. 4, the control unit 150 analyzes the slide touch signal from the touch panel 130 to detect the left-to-right slide direction and the touch area size decrement and determine one of the left hand grip state and determine the right hand grip state.

The touch gesture analysis and right hand grip state determination can be performed by the control unit 150, based on the preconfigured mapping information between the right hand grip mode and at least one of the touched position, the movement direction of touch, and the change in size of the touched area.

Referring to FIG. 5, when the user slides the left thumb from top to bottom on the touchscreen 110 in the left hand grip state, the touched area size decreases as denoted by reference characters c1, c2, c3, and c4.

This is because, in the left hand grip state, the contact area on the screen surface shrinks as the stretched left thumb joints are folded to make the top-to-bottom sliding gesture.

The left hand top-to-bottom sliding gesture is also characterized in that the initial touch area has the shape of an ellipse with its longest axis oriented from bottom left to the top right as denoted by reference character c1. The left hand top-to-bottom sliding gesture is also characterized in that the sliding is biased to the left of the longitudinal axis of the screen.

In this respect, the touch panel 130 is configured to detect the left hand top-to-bottom sliding gesture made on the touchscreen 110 and transmit the corresponding slide touch information to the control unit 150.

The control unit 150 is configured to analyze the slide touch information to acquire at least one of the touch position, the touched area shape, the slide direction, and the change in size of the touched area.

In the case shown in FIG. 5, the control unit 150 analyzes the slide touch signal from the touch panel 130 to detect the top-to-bottom slide direction, the touch area size decrement, the ellipse shape of the initial touch area, and the left-biased movement and determines the left hand grip state based on a result of the analysis.

The touch gesture analysis and left hand grip state determination can be performed by the control unit 150, based on the preconfigured mapping information between the left hand grip mode and at least one of the touched position, the movement direction of the touch, the change in size of the touched area, and the shape of the initial touch area.

Referring to FIG. 6, when the user slides the right thumb from top to bottom on the touchscreen 110 in the right hand grip state, the touched area size decreases as denoted by reference characters d1, d2, d3, and d4.

This is because, in the right hand grip state, the contact area on the screen surface shrinks as the stretched left thumb joints are folded to make the top-bottom sliding gesture.

The right hand top-to-bottom sliding gesture is also characterized in that the initial touch area has the shape of an ellipse with its longest axis oriented from the bottom right to the top left as denoted by reference character d1. The right hand top-to-bottom sliding gesture is also characterized in that the sliding is biased to the right side of the longitudinal axis of the screen.

In this respect, the touch panel 130 is configured to detect the right hand top-to-bottom sliding gesture made on the touchscreen 110 and transmit the corresponding slide touch information to the control unit 150.

The control unit 150 is configured to analyze the slide touch information to acquire at least one of the touch position, the touched area shape, the slide direction, and the change in size of the touched area.

In the case shown FIG. 6, the control unit 150 analyzes the slide touch signal from the touch panel 130 to check the top-to-bottom slide direction, the touch area size decrement, the ellipse shape of the initial touch area, and the right-biased movement, and determines the left hand grip state based on the analysis result.

The touch gesture analysis and right hand grip state determination can be performed by the control unit 150, based on the preconfigured mapping information between the right hand grip mode and at least one of the touched position, the movement direction of the touch, the change in size of the touched area, and the shape of the initial touch area.

Although not shown in the drawings, the touch panel 130 may also be configured to trace the touch input and determine the user's left/right hand grip state even in the standby mode and/or execution mode as well as the sleep and locked mode of the touch-enabled device.

In order to accomplish this, the touch-enabled device may provide a signal hand grip mode selection menu for rearrangement of the UI according to the user's selection of a single hand grip mode in the standby mode and/or execution mode. This menu can be activated by the user's selection in the standby mode and/or execution mode.

The menu may be provided in the form of a pattern preconfigured to detect the user's left or right hand grip, or an icon or a list allowing for the selection of one of left and right hand grip modes.

In an embodiment in which the predetermined pattern is used, the pattern can be a sliding pattern of a left-to-right drag touch, a right-to-left drag touch, a top-to-bottom drag touch, or a bottom-to-top drag touch.

Here, the term 'drag touch' denotes a touch gesture of dragging a finger along a pattern presented on the touchscreen 110. The drag touch is a touch input method selected for detecting the change of the touched area size on the touchscreen 110 in the single hand grip state.

In contrast to providing the single hand grip mode selection menu, the signal hand grip mode can instead be determined by analyzing a touch input signal occurring over a predetermined time duration or at predetermined time intervals periodically in another embodiment of the present invention.

That is, according to an embodiment of the present invention, the control unit 150 analyzes a touch input lasting for predetermined time duration or at predetermined periods and touch input frequency to determine the user's single hand grip state.

The touch input information may include at least one of a touch type, such as, for example, drag touch and tap touch, contact position of the touch, movement direction of the touch, change of a contact area, and the size of the contact area.

For example, if a number of touch inputs identical or similar to the touch inputs matching the reference left/right hand grip modes is equal to or greater than a predetermined threshold value within the predetermine period, the control unit 150 determines that the user holds the device by the left/right hand.

That is, without extra user interaction for selecting the hand grip mode, the control unit 150 is configured to determine whether the user is holding the device with the left or right hand by detecting the touch input occurring for the predetermined duration or at the predetermined periods, and analyzing the contact position, movement direction, contact area size change, and occurrence frequency of the touch input.

The control unit 150 is also configured to detect the touch input occurring periodically, analyze the touch input to determine the single hand grip state, and switch between the left hand-oriented and right hand-oriented UI modes in real time depending on the hand grip state.

The control unit 150 is also configured to display the UI differently according to the determined single hand grip state. The detailed description of this process is described with reference to FIG. 7.

Figure 7:
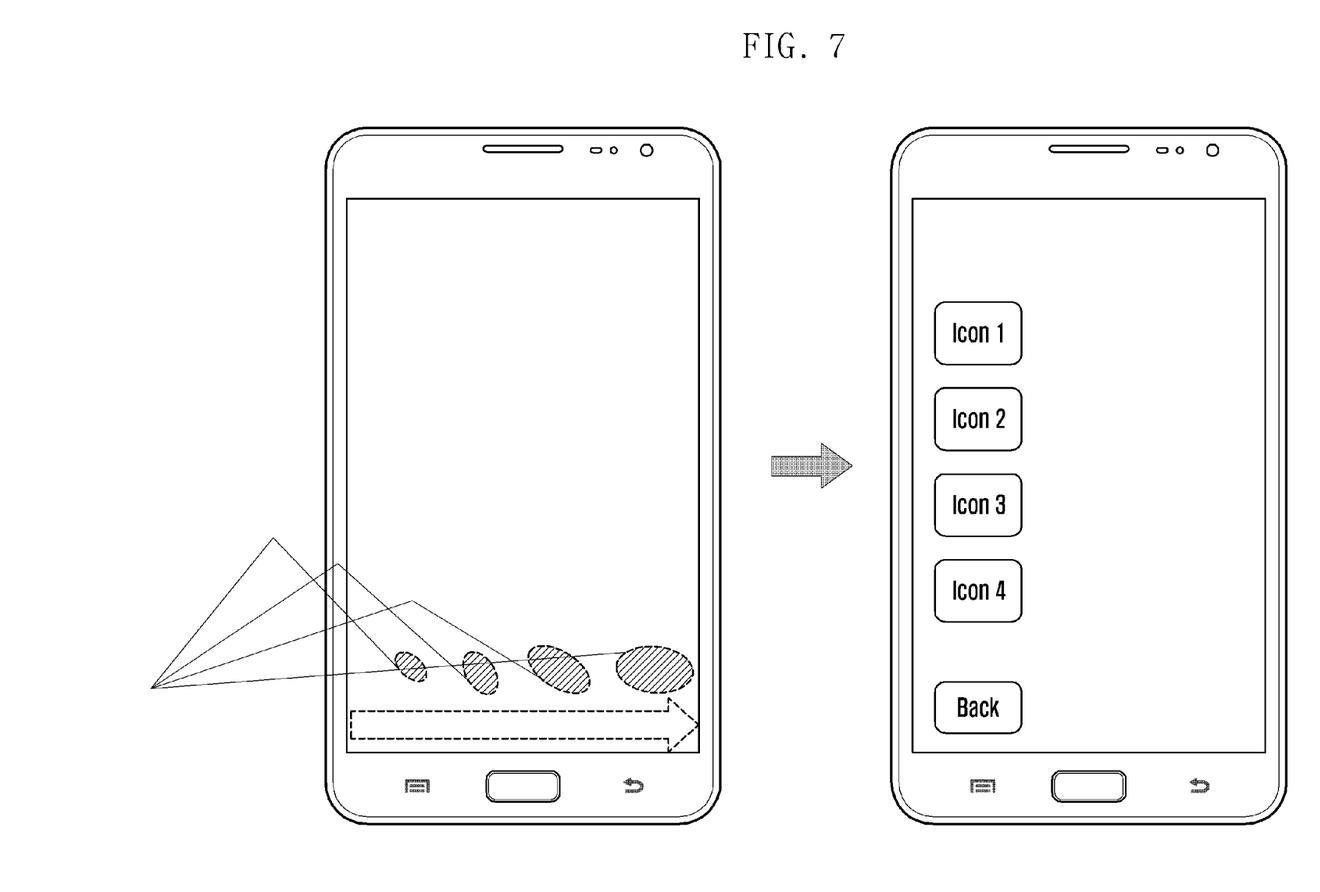
FIG. 7 is a diagram illustrating an example of determining the left hand grip state and arranging a left hand-oriented UI on the screen in the user interface display method according to an embodiment of the present invention.

FIG. 7 shows a situation in which the left hand grip state is determined and, thus, the left hand-oriented UI is presented on the screen according to an embodiment of the present invention.

Referring to FIG. 7, the control unit 150 controls the touchscreen 110 to display the left/right hand-oriented UI according to the left/right hand grip state determined through the procedure described above with reference to FIGS. 2 to 6.

That is, the control unit 150 configures the left hand-oriented UI in the left hand grip state and the right hand-oriented UI in the right hand grip state for the user's manipulation convenience.

The UI components may include a plurality of icons, menu items, lists, etc. The control unit 150 is configured to store arrangement coordinates and order of the UI components prompting the user's touch input to match with the left and right hand-oriented UI modes.

For example, the control unit 150 is configured to arrange the UI components at the left side of longitudinal axis of the screen in the left hand-oriented UI mode shown in FIG. 7.

By configuring the UI to match with the single hand grip mode, the user is capable of executing a certain application or entering the execution screen of the application more expeditiously.

According to an embodiment of the present invention, the UI display method and apparatus is configured to detect the touch input occurring at a predetermined period and determining the left/right hand grip state by analyzing the touch input to arrange the UI to match with the user's single hand grip state.

According to an embodiment of the present invention, the UI display method and apparatus is configured to acquire the analysis information regarding the contact position, the movement direction, the contact area size, and the occurrence frequency by analyzing the touch gesture made by the user and determining the user's hand grip state based on the analysis information without requiring an extra sensor, resulting in a reduction of a manufacturing cost and fulfillment of requirements for slim design of the touch-enabled device.

Figure 8:
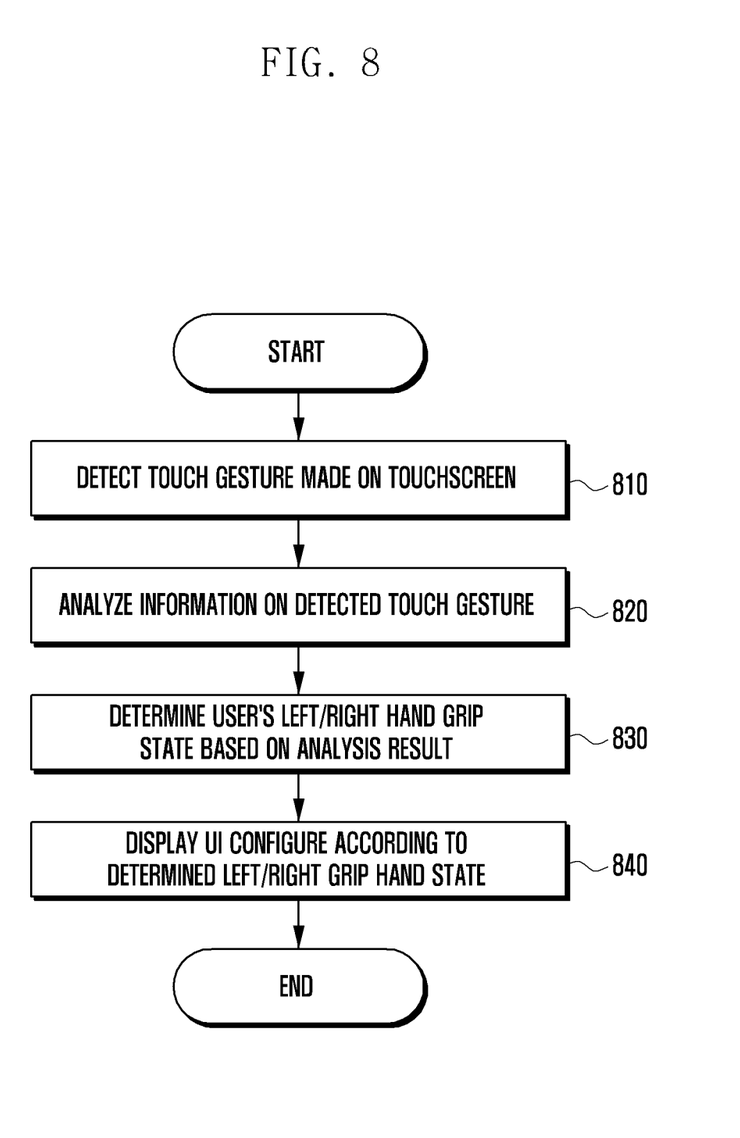
FIG. 8 is a flowchart illustrating a UI display method of a touch-enabled device according to an embodiment of the present invention.

FIG. 8 is a flowchart illustrating a UI display method of a touch-enabled device according to an embodiment of the present invention.

Referring to FIG. 8, in step 810, the control unit 150 detects a touch gesture made on the touchscreen of the touch-enabled device. For example, the control unit 150 is configured to detect the touch gesture made on the touchscreen in one of the lock mode, standby mode, sleep mode, and execution mode. The control unit 150 is also capable of detecting the touch gesture made for a predetermined time duration or occurring periodically at predetermined time intervals.

In step 820, the control unit 150 analyzes the touch gesture to acquire information on the touch input. For example, the control unit 150 is capable of analyzing at least one of contact area size, contact position, movement direction, and occurrence frequency of the touch gesture.

For example, the control unit 150 is configured to analyze at least one of the contact position, movement direction, change of contact area size, and occurrence frequency of the touch gesture based on the information matched to the left/right hand grip.

In step 830, the control unit 150 determines the left or right hand grip state based on a result of the analysis of step 820.

In step 840, the control unit 150 displays the left/right hand-oriented UI arranged according to the left/right hand grip state determined in step 830.

That is, the control unit 150 is configured to control the touchscreen 110 to display the left hand-oriented UI in the left hand grip state and the right hand-oriented UI in the right hand grip state for user convenience.

The UI is configured to include icons, menu items, and lists. The control unit 150 is configured to store the arrangement coordinates and order of the UI components prompting the user's touch input to match with the left and right hand-oriented UI modes.

As described above, the UI display method and apparatus of the present invention configures the UI of the device optimally according to the user's left/right hand grip state, resulting in improvement of user convenience.

Also, the UI display method and apparatus of the present invention determine the user' single hand grip state and provide a UI configured optimally according to the UI arrangement coordinates and order to match with the left/right grip state.

Also, the UI display method and apparatus of the present invention change the UI arrangement according to the change of the left/right hand grip state in real time.

Also, the UI display method and apparatus of the present invention according to an embodiment of the present invention analyze at least on of the contact area size, contact position, movement direction, and occurrence of a touch gesture and determine the user's hand grip state based on the analysis result without requiring an extra sensor, resulting in a reduction of manufacturing cost and slim design of the device.

Furthermore, the UI display method and apparatus of the present invention provide the user with the UI optimized to match with the user's single hand grip state so as to facilitate application execution and access to application execution screen, resulting in improvement of device usability.

The above-described UI display method of apparatus according to an embodiment of the present invention may be implemented in the form of computer-executable program commands and stored in a non-transitory computer-readable storage medium. The computer readable storage medium may store the program commands, data files, and data structures in individual or combined forms. The program commands recorded in the storage medium may be designed and implemented for various exemplary embodiments of the present invention or used by those skilled in the computer software field.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various exemplary embodiments of the present invention.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

What is claimed is:

1. A user interface display method of a touch-enabled device, the method comprising:
   detecting a touch gesture;
   analyzing (i) a contact position, a movement direction, a contact area size, and a contact area shape of the detected touch gesture, or (ii) a contact position and an occurrence frequency of the detected touch gesture based on a longitudinal axis of the device, depending on a type of the detected touch gesture;
   determining one of a left hand grip state and right hand grip state of the device based on a result of the analysis; and
   displaying a user interface corresponding to the determined one of the left hand grip state and the right hand grip state,
   wherein the touch gesture is made over a predetermined time duration or periodically at predetermined time intervals,
   wherein analyzing the detected touch gesture comprises one of measuring a time duration for which the touch gesture is maintained and counting the touch gestures occurring periodically, and
   wherein determining the grip state results in a determination of the left hand grip state when the occurrence frequency of the touch gesture made at a left part of the longitudinal axis of the device is equal to or greater than a predetermined frequency.

2. The method of claim 1, further comprising: mapping (i) the contact position, the movement direction, the contact area size and the contact area shape of the detected touch gesture or, (ii) the contact position and the occurrence frequency of the detected touch gesture depending on type of the detected touch gesture to the one of the left hand grip state and the right hand grip state.

3. The method of claim 1, further comprising:
   preconfiguring arrangement coordinates and an order of at least one of a menu, an icon, and a list in the user interface per the left hand grip state or the right hand grip state.

4. The method of claim 1, wherein the touch gesture is made to wake up the device from a sleep mode or to unlock a locked state of the device with a pattern-unlock mechanism or a slide-to-unlock mechanism.

5. The method of claim 1, wherein determining the grip state results in a determination of the right hand grip state when the occurrence frequency of the touch gesture made at a right part of the longitudinal axis of the device is equal to or greater than a predetermined frequency.

6. The method of claim 1, wherein analyzing the detected touch gesture comprises checking a drag direction of the touch gesture from a start point to an end point of the touch gesture and a change of the contact area size.

7. The method of claim 6, wherein determining the grip state results in a determination of the left hand grip state when the drag direction is a left-to-right direction and the contact area size increases from left to right.

8. The method of claim 6, wherein determining the grip state results in a determination of the right hand grip state when the drag direction is a right-to-left direction and the contact area size decreases from right to left.

9. The method of claim 6, wherein determining the grip state results in a determination of the left hand grip state when the drag direction is a top-to-bottom direction, the contact area size decreases, and an initial contact area shape is an ellipse with its longest axis oriented from bottom left to the top right.

10. The method of claim 6, wherein determining the grip state results in a determination of the right hand grip state when the drag direction is a top-to-bottom direction, the contact area size decreases, and an initial contact area shape is an ellipse with its longest axis oriented from bottom right to the top left.

11. The method of claim 1, wherein displaying the user interface comprises arranging, when the hand grip state is the left hand grip state, the user interface at a left part of the longitudinal axis of the device or, when the hand grip state is the right hand grip state, at a right part of the longitudinal axis, on a screen of the device.

12. The method of claim 11, wherein displaying the user interface comprises arranging at least one of an icon, a menu, and a list from top to bottom of the screen at a regular interval.

13. The method of claim 11, wherein displaying the user interface comprises arranging, when the hand grip state is the right hand grip state, at least one of an icon, a menu, and a list from a side to a center of the screen at a regular interval.

14. The method of claim 13, wherein displaying the user interface comprises arranging, when the hand grip state is the left hand grip state, the user interface from a left side of the screen.

15. The method of claim 13, wherein displaying the user interface comprises arranging, when the hand grip state is the right hand grip state, the user interface from a right side of the screen.

16. A user interface display apparatus of a touch-enabled device, the apparatus comprising:
   a display panel configured to display a user interface;
   a touch panel configured to detect a touch gesture made on the display panel; and
   a control unit configured to analyze (i) a contact position, a movement direction, a contact area size, and a contact area shape of the detected touch gesture, or (ii) a contact position and an occurrence frequency of the detected touch gesture based on a longitudinal axis of the device, depending on a type of the detected touch gesture, determine one of a left hand grip state and a right hand grip state of the device based on a result of the analysis, and display a user interface corresponding to the determined one of the left hand grip state and the right hand grip state, wherein the touch gesture is made over a predetermined time duration or periodically at predetermined time intervals, wherein analyzing the detected touch gesture comprises one of measuring a time duration for which the touch gesture is maintained and counting the touch gestures occurring periodically, and wherein determining the grip state results in a determination of the left hand grip state when the occurrence frequency of the touch gesture made at a left part of the longitudinal axis of the device is equal to or greater than a predetermined frequency.

17. The apparatus of claim 16, wherein the control unit arranges the user interface according to preconfigured arrangement coordinates and an order according to the hand grip state.

* * * * *